(12) United States Patent
Croome (10) Patent No.: US 8,473,008 B2
(45) Date of Patent: *Jun. 25, 2013

(54) WIRELESS ENABLED MEMORY MODULE

(75) Inventor: Martin Croome, Brié et Angonnes (FR)

(73) Assignee: Socket Mobile, Inc., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/236,351

(22) Filed: Sep. 19, 2011

(65) Prior Publication Data

US 2012/0207341 A1 Aug. 16, 2012

Related U.S. Application Data

(63) Continuation of application No. 10/939,857, filed on Sep. 13, 2004, now Pat. No. 8,023,998, which is a continuation-in-part of application No. PCT/US03/10532, filed on Apr. 8, 2003.

(60) Provisional application No. 60/370,682, filed on Apr. 8, 2002, provisional application No. 60/390,019, filed on Jun. 19, 2002.

(51) Int. Cl.
*H04B 1/38* (2006.01)

(52) U.S. Cl.
USPC ........ 455/558; 455/41.2; 455/41.3; 455/3.06; 455/420; 455/550.1; 455/557; 711/115

(58) Field of Classification Search
USPC ................. 455/41.2, 41.3, 550.1, 556.1, 557, 455/558, 420, 3.06; 711/115; 358/1.15, 1.16, 358/1.17; 709/247
See application file for complete search history.

(56) References Cited

U.S. PATENT DOCUMENTS

| | | | | |
|---|---|---|---|---|
| 6,842,818 B2 * | 1/2005 | Okamoto et al. | ............. | 710/307 |
| 6,886,083 B2 * | 4/2005 | Murakami | ..................... | 711/156 |
| 7,107,378 B1 * | 9/2006 | Brewer et al. | ................. | 710/300 |
| 7,194,565 B2 * | 3/2007 | Mills et al. | ..................... | 710/301 |
| 7,343,439 B2 * | 3/2008 | Mills et al. | ..................... | 710/301 |
| 2004/0103234 A1 * | 5/2004 | Zer et al. | ....................... | 710/301 |

* cited by examiner

*Primary Examiner* — Olumide T Ajibade Akonai
(74) *Attorney, Agent, or Firm* — PatentVentures: Bennett Smith; Korbin Van Dyke (57) ABSTRACT

A wireless-enabled memory module provides host devices access to a memory via a standard memory expansion interface and further incorporates embedded processing capability and a wireless network capability. The wireless-enabled memory module can be used in any host device providing a compatible memory card controller and interface. Host devices so equipped become wireless-memory enabled devices and can provide memory access to any other remote device enabled for compatible wireless communications. It is thereby possible for a remote device to access the memory content of the memory module, and cause transfers of either full-size or scaled versions of the content to the remote device through a first network, and optionally further transfer the content from the remote device through a second network to the Internet in the form of an e-mail message or MMS attachment.

20 Claims, 5 Drawing Sheets

WIRELESS ENABLED MEMORY MODULE

CROSS REFERENCE TO RELATED APPLICATIONS

This application is a continuation of U.S. patent application Ser. No. 10/939,857 entitled WIRELESS ENABLED MEMORY MODULE filed Sep. 13, 2004, now U.S. Pat. No. 8,023,998; which is a continuation-in-part of, and claims the benefit of priority under 35 U.S.C. §365(c) of, PCT International Application No. PCT/US03/10532 entitled WIRELESS ENABLED MEMORY MODULE, which has an International filing date of Apr. 8, 2003, which designated the United States of America, and was published under PCT article 21(2) in English; the aforementioned PCT International Application No. PCT/US03/10532 claiming the benefit of U.S. Provisional Patent Application Ser. No. 60/370,682 entitled WIRELESS ENABLED MEMORY MODULE filed Apr. 8, 2002; and the aforementioned PCT International Application No. PCT/US03/10532 also claiming the benefit of U.S. Provisional Patent Application Ser. No. 60/390,019 entitled WIRELESS ENABLED MEMORY MODULE filed Jun. 19, 2002. The aforementioned applications are hereby incorporated in their entirety herein by reference for all purposes.

FIELD OF THE INVENTION

The present invention relates generally to memory modules and wireless connectivity. More specifically, it relates to memory modules for operation with a host, a remote device, and a network.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description. The invention is not limited to the concepts presented in the introduction, as the paragraphs of any introduction are necessarily an abridged view of the entire subject and are not meant to be an exhaustive or restrictive description. For example, the introduction that follows provides overview information limited by space and organization to only certain embodiments. There are in fact many other embodiments, including those to which claims will ultimately be drawn, which are discussed throughout the balance of the specification. As is discussed in more detail in the Conclusions, the invention encompasses all possible modifications and variations within the scope of the issued claims, which are appended to the very end of the issued patent.

A wireless-enabled memory module (WEMM) in accordance with the invention provides devices access to a memory via a standard memory interface and further incorporates embedded processing capability and a wireless network capability. This card can be used in any host device providing a compatible memory card controller and interface. Host devices equipped with a WEMM become wireless-memory enabled devices (WMED). WEMMs and WMEDs can communicate with any other remote device enabled for compatible wireless communications. Remote devices so enabled are referred to herein as Remote Wireless-enabled Devices (RWED).

The wireless network capability and embedded processing of the WEMM provides RWEDs (such as a mobile phone, PDA, or PC) read and write access to the contents of the memory in the WEMM via a wireless connection, such as a BlueTooth connection in an illustrative embodiment. As an implementation option, the memory of the WEMM may be embedded, may be a removable flash memory card, or both.

The RWED can use this wireless access provided by the WEMM to perform selective data transfers between the WEMM's memory and internal storage within the RWED. Additionally, by e-mail or MMS attachments sent via an additional network, the RWED may act as an intermediary to transfer data (in either direction) between the WEMM's memory and the Internet. For example, a BlueTooth-enabled mobile phone user could access a WEMM that is inserted in a digital camera host. The user could send a friend one or more photos as an e-mail message. The e-mail would result in the transfer of some or all of the stored images from the camera host over the BlueTooth connection to the remote mobile phone, and then to the Internet via the mobile phone network. Similarly, received attachments may be stored to the WEMM.

As a further implementation option, the embedded processing on the WEMM may include a media-scaling engine that can scale the contents to different sizes before transmission over the wireless connection. This enables the user to browse the memory contents in thumbnail form quickly and easily from the remote device. It also permits the user to retrieve a version of the selected content that has been scaled appropriately for the bandwidth capabilities of the BlueTooth connection or mobile network. In a preferred embodiment, the media-scaling engine is implemented using signal processing hardware. However, some or all of its functionality may be also implemented via firmware in the processor subsystem.

Wireless Enabled Memory Module (WEMM)

Figure 1A:
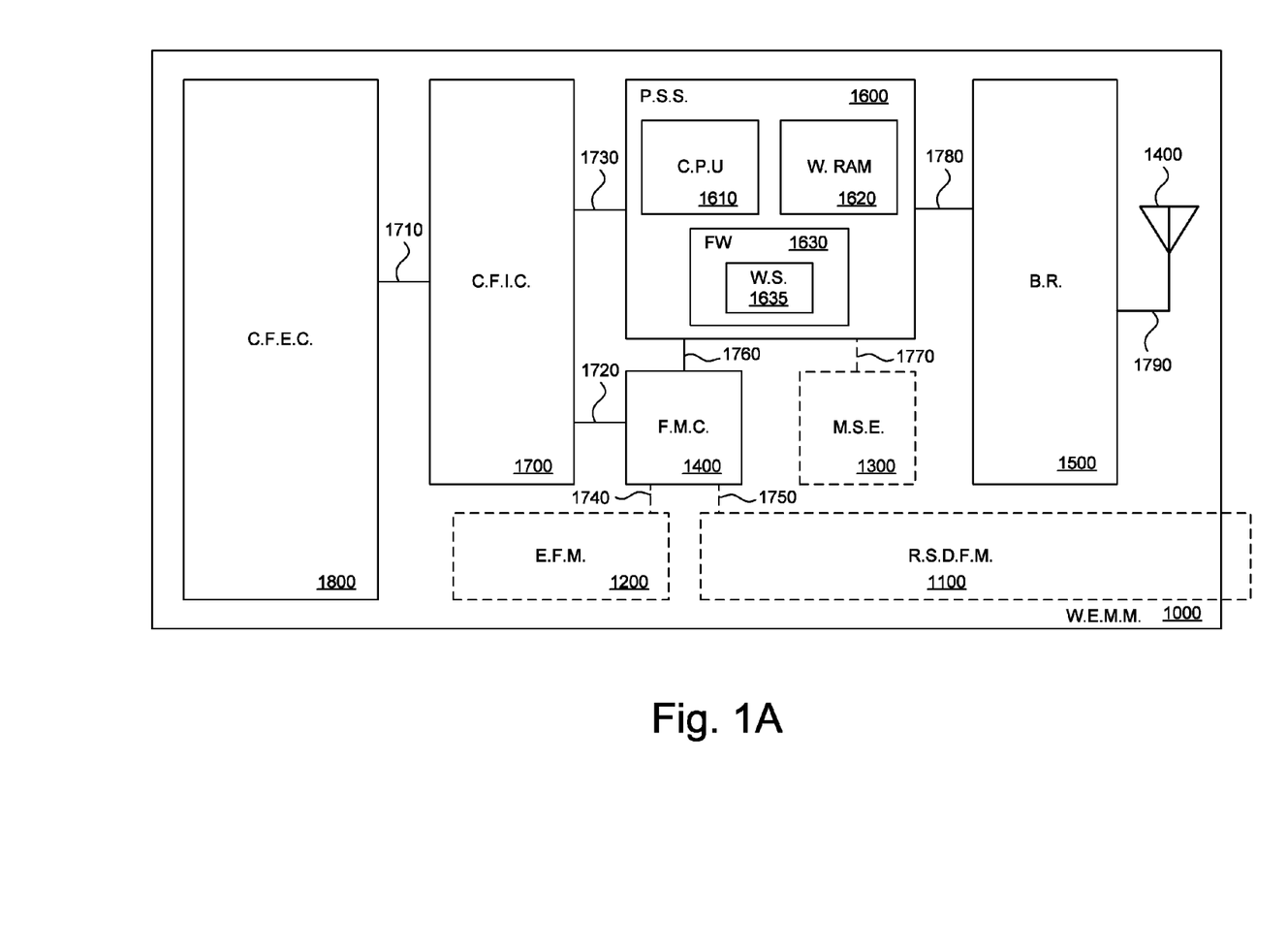
FIG. 1A is a block diagram of a wireless-enabled memory module (WEMM) 1000, physically and electrically compatible with the Compact Flash expansion module standard, and in accordance with the present invention.
Figure 1B:
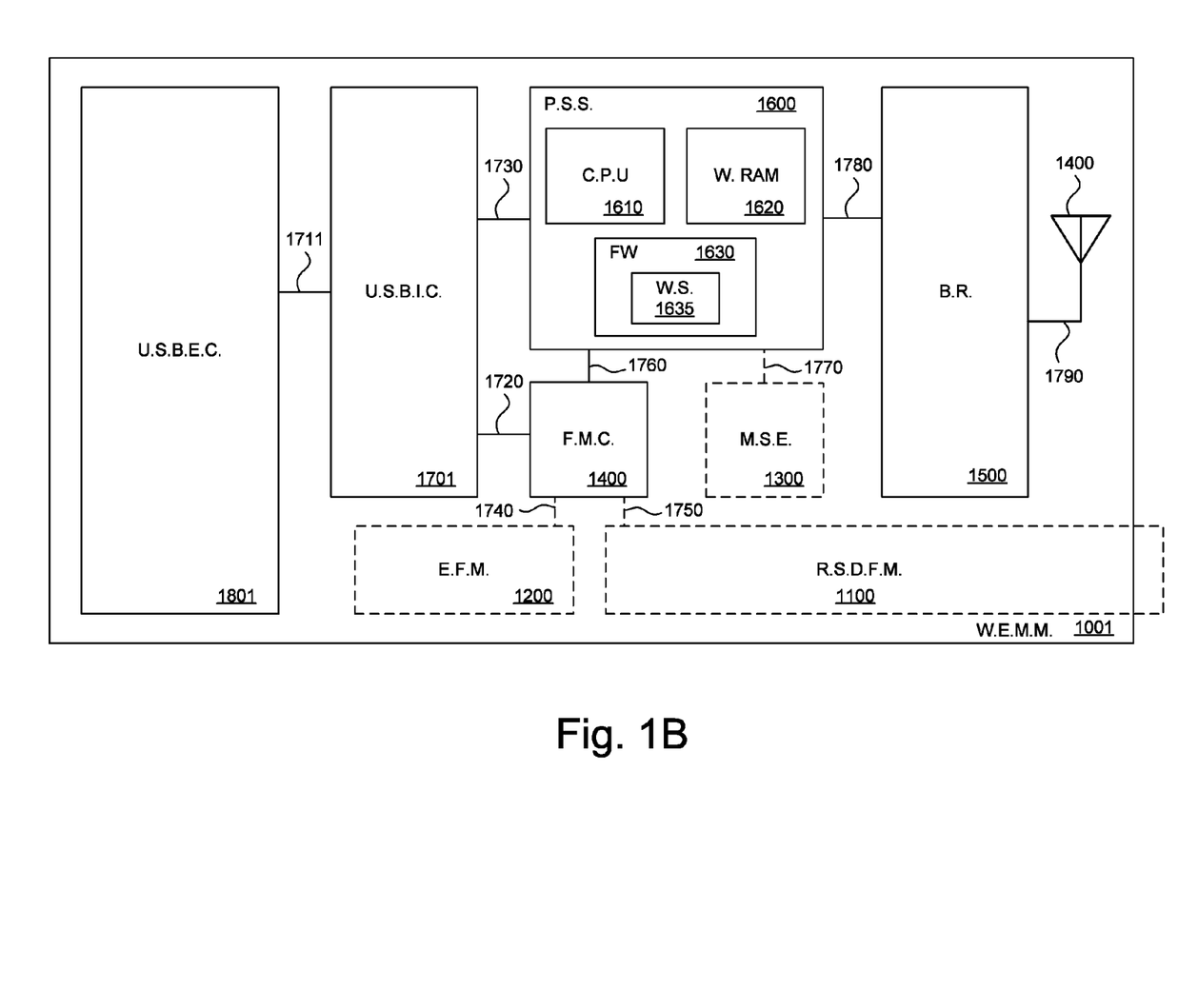
FIG. 1B is a block diagram of a wireless-enabled memory module (WEMM) 1001, physically and electrically compatible with the Universal Serial Bus (USB) standard, and in accordance with the present invention.

Table 1 identifies and expands the abbreviations used in FIGS. 1A and 1B.

TABLE 1

| Associated ID No. | Abbreviation(s) | Expanded Name |
|---|---|---|
| 1000 | W.E.M.M. | Wireless Enabled Memory Module |
| 1001 | W.E.M.M. | Wireless Enabled Memory Module |
| 1100 | R.S.D.F.M. | Removable Secure Digital Flash Memory |
| 1200 | E.F.M. | Embedded Flash Memory |
| 1300 | M.S.E. | Media Scaling Engine |
| 1400 | F.M.C. | Flash Memory Controller |
| 1500 | B.R. | Bluetooth Radio |
| 1600 | P.S.S. | Processor Sub-System |
| 1610 | C.P.U. | Processor |
| 1620 | W.RAM | Working RAM |
| 1630 | FW | Firmware |
| 1635 | W.S. | Web Server |
| 1700 | C.F.I.C | CompactFlash Interface Controller |
| 1701 | U.S.B.I.C | Universal Serial Bus Interface Controller |
| 1800 | C.F.E.C. | CompactFlash Expansion Connector |
| 1801 | U.S.B.E.C. | Universal Serial Bus Expansion Connector |

In the illustrative embodiment of FIG. 1A, the WEMM 1000 and interface (1700, 1710, and 1800) to the host are compatible with the Compact Flash industry standard. The WEMM's memory includes both embedded flash memory 1200 and removable flash memory 1100 compatible with the Secure Digital (SD) industry standard. The wireless network is a Wireless Personal Area Network (WPAN) compatible with the Bluetooth industry standard.

As will be appreciated by those skilled in the art, the specifics of each implementation will dictate the particular requirements of the wireless interface. In an illustrative embodiment intended primarily for use with mobile phones, a low-speed, low-cost, Bluetooth interface 1500 is used. In another illustrative embodiment intended primarily for use with computing devices, such as PCs, a higher-speed, higher-cost, Bluetooth interface is used. The higher speed interface will reduce the time required to transfer a given file and will make the transfer of larger multimedia objects (e.g. higher resolution images and higher quality music) more practical. It will be appreciated by those skilled in the art that the baseband functions of the radio may be stored in the WEMM's integral firmware and performed via the WEMM's integral processor. It will be further appreciated that different applications may call for the use of other wireless interface standards. By way of example and not limitation, instead of Bluetooth, the radio technology used could also include any of the WiFi, UWB, and Zigbee wireless standards.

In the additional illustrative embodiment of FIG. 1B, the WEMM 1001 and interface (1701, 1711, and 1801) to the host are compatible with any of the USB industry standards. Such standards include the Universal Serial Bus Specification 1.1, Sep. 23, 1998, and Universal Serial Bus Specification 2.0, Apr. 27, 2000. Both specifications are available from http://www.usb.org and are hereby incorporated in their entirety herein by reference for all purposes. USB expansion connector 1801 may be any of several physical configurations compatible with any of the USB industry standards, such as an "A" style plug, a standard "B" style receptacle, and a "mini-B" style receptacle. The remaining aspects of WEMM 1001 are substantially similar to WEMM 1000.

Note that the WEMMs 1000 and 1001 constitute first-level removable modules and the removable flash memory 1100 constitutes a second-level removable module. It will be appreciated by those skilled in the art that there are a number of choices for each of these miniature-form-factor standard interfaces. Thus the WEMM 1000 is not restricted to the CF standard, the WEMM 1001 is not restricted to any of the USB standards, and the removable flash memory 1100 is not restricted to the SD standard. By way of example and not limitation, the WEMM 1000 may also be implemented as a PC Card in either 16-bit or 32-bit formats. Further by way of example and not limitation, WEMM 1001 may also be implemented to be compatible with other high performance serial interfaces, including the FireWire standards. Further by way of example and not limitation, the removable flash memory 1100 may be implanted to be compatible with any of the SmartCard, Memory Stick, MMC, and xD-Picture card standards. None of these examples is limiting, as the permutations for combining various technology choices for the WEMM (1000 or 1001) and the removable flash memory is only limited by the relationship that any removable flash memory must fit at least in part within the WEMM (1000 or 1001).

A first system application of the WEMM is the wireless transfer of digital photos between a camera and a mobile phone, for associated transfer via the mobile phone network. There is a large installed base of digital cameras that use standard removable memory cards, but do not have I/O expandability or wireless network functionality. These cameras can be augmented with a wireless-enabled memory module, in accordance with the present invention, to send photos via a mobile phone or any other compatibly enabled wireless communications device.

Illustrative System

Figure 2:
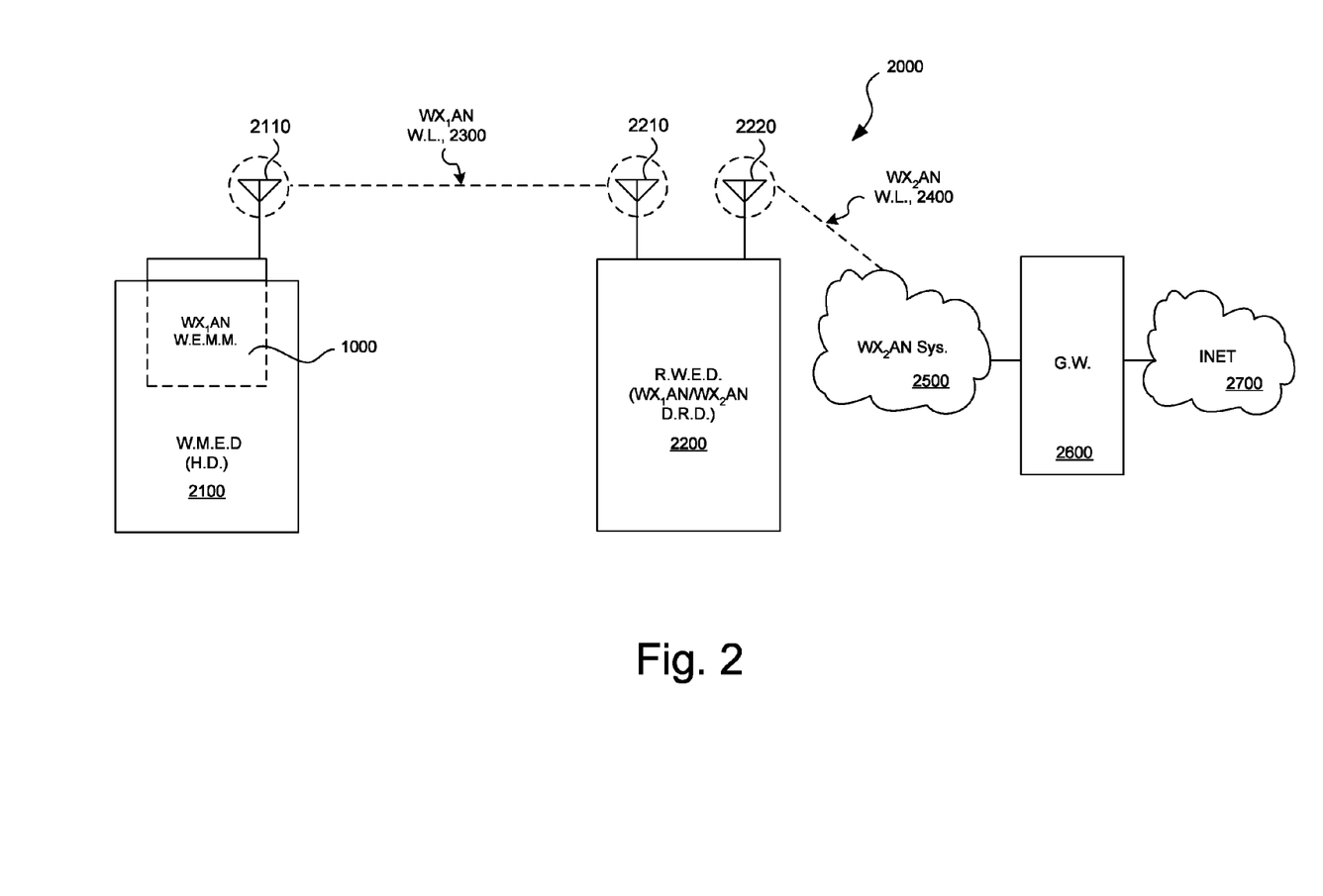
FIG. 2 is a diagram of a system 2000, in accordance with the present invention, illustrating how data on a host device 2100 equipped with a WEMM 1000 may be transmitted over a variety of networks (including 2300, 2500, and 2700).

Table 2 identifies and expands the abbreviations used in FIG. 2.

татBLE 2

| Associated ID No. | Abbreviation(s) | Expanded Name |
|---|---|---|
| 2000 | (none) | (none) |
| 2100 | W.M.E.D. (H.D.) | Wireless Memory Enabled Device (Host Device) |
| 2200 | R.W.E.D. (WX$_1$AN/ WX$_2$AN D.R.D.) | Remote Wireless Enabled Device (WX$_1$AN/WX$_2$AN Dual Remote Device) |
| 2300 | WX$_1$AN W.L. | WX$_1$AN Link |
| 2400 | WX$_2$AN W.L. | WX$_2$AN Link |
| 2500 | WX$_2$AN SYS | WX$_2$AN System |
| 2600 | G.W. | Gateway |
| 2700 | INET | Internet |

A general application for the invention is the illustrative system 2000 of FIG. 2. FIG. 2 illustrates a host device having no native integral wireless capability (such as a camera or a portable audio device) into which a WEMM, such as WEMM 1000, is inserted. Alternate applications (not illustrated) may use a WEMM, such as WEMM 1001, that is coupled to a host device. The resulting combination of WEMM 1000 and the host device is a WMED 2100 as previously defined. A WMED communicates with an RWED (e.g. mobile phone) having at least one wireless interface. In FIG. 2, the WMED 2100 communicates with the RWED 2200 over a $WX_1AN$ 2300 (a wireless area network of a first type), such as the BlueTooth Wireless Personal Area Network (WPAN) standard. To illustrate a more general system, the RWED 2200 of FIG. 2 is a Dual $WX_1AN/WX_2AN$ device (i.e., it has two wireless interfaces), such as a mobile phone or wireless-enabled PDA.

In many applications, the WMED 2100 and its associated user interface will be unaware of the capabilities of the WEMM 1000 and offer no means to control it. In an illustrative embodiment, the $WX_1AN$ 2300 connection enables the RWED 2200 to access the content within the memory of the WEMM 1000 through a browser-server relationship. The server functionality 1635, which has an associated implementation of the WAP-over-BlueTooth protocol, is stored in the WEMM's integral firmware 1630 and is performed via the WEMM's integral processor 1610. (WAP is the Wireless Application Protocol.).

Thus the user interface to the WEMM 1000 is accomplished via an embedded WAP/Web server 1635 within the WEMM 1000 communicating with a WAP browser on the RWED 2200. The RWED browser-based interface allows the user to:

- Browse the contents of the memory (as discussed below, either/both of 1100 or/and 1200) in the WEMM, viewing thumbnail size versions created by an embedded media scaling engine 1300;
- Send a multimedia object (e.g., a photograph), optionally scaled to one of a number of sizes via the scaling engine, as an MMS (Multimedia Message Service, a multimedia extension of SMS) or email attachment via a cell phone; and
- Load a received attachment into the WEMM for storage or for use (e.g., viewing on a camera).

In an alternate embodiment, the user interface makes use of the knowledge of the memory controller of the last file written to allow short cuts, such as "send the last photograph taken".

In an alternate embodiment, the remote device implements a custom user interface created with the SmartPhone2002 or J2ME Java engines instead of the generic WAP browser.

The Dual $WX_1AN/WX_2AN$ RWED 2200 is in turn connected to a $WX_2AN$ system 2500 (a wireless area network of a second type), such as the GSM Wireless Wide Area Network (WWAN) standard, which in turn connects through a Gateway 2600 to the Internet 2700. The RWED 2200 can then retrieve content from the memory (either/both of 1100 or/and 1200) in the WEMM 1000 via the $WX_1AN$ 2300 and send it (for example in e-mail or MMS form) via the $WX_1AN$ 2500 through a Gateway 2600 to the Internet 2700.

To accommodate the lower-speed interfaces that may be employed, either between the WEMM 1000 and the remote device 2200, or between the remote device 2200 and its WXAN 2500, the WEMM additionally includes processing functionality to scale the size of an individual media item that is sent to the remote device. When the user wishes to browse the content of the memory in the WEMM from the remote device, the WEMM 1000 would send "thumbnail" scaled versions through the BlueTooth connection 2300, for quick browsing. When a media item is selected, it can be sent to the remote device 2200 in one of a number of larger scaling levels, depending on the wireless bandwidths involved.

In an illustrative embodiment using a low-speed Bluetooth interface, camera owners will be able to send postcard versions of snapshots via a mobile phone, using cameras that do not have integral wireless network capability. The invention thus will enable and expand the market for sending and receiving snapshots over wireless networks.

In an illustrative embodiment using a high-speed Bluetooth interface, large high-resolution files may be transferred between a camera equipped with the wireless-enabled memory module and a PC. The invention thus will enable and expand the market for PC-based digital photography, including storage, backup, and archiving of digital photographs.

Other system applications of the wireless-enabled memory module enable other devices to communicate via a mobile phone or to computing devices such as PCs. An example is transfer of MP3 files between an MP3 player and a mobile phone, for associated transfer via the mobile phone network, by equipping the MP3 player with a wireless-enabled memory module having a low-speed Bluetooth implementation. Another example is transfer of large music files between an audio device (e.g. a home entertainment system) and a PC, by equipping the audio device with a wireless-enabled memory module having a high-speed Bluetooth implementation.

As an implementation option, the memory capability of the WEMM 1000 is implemented using an embedded fixed size memory 1200, a removable memory 1100 (for example a removable SD memory device), or both. In an illustrative embodiment, the removable memory is a second-level module and the wireless-enabled memory module is a first-level module, such as those disclosed by U.S. Pat. No. 6,353,870, CLOSED CASE REMOVABLE EXPANSION CARD HAVING INTERCONNECT AND ADAPTER CIRCUITRY FOR BOTH I/O AND REMOVABLE MEMORY.

Asic Embodiment

Figure 3:
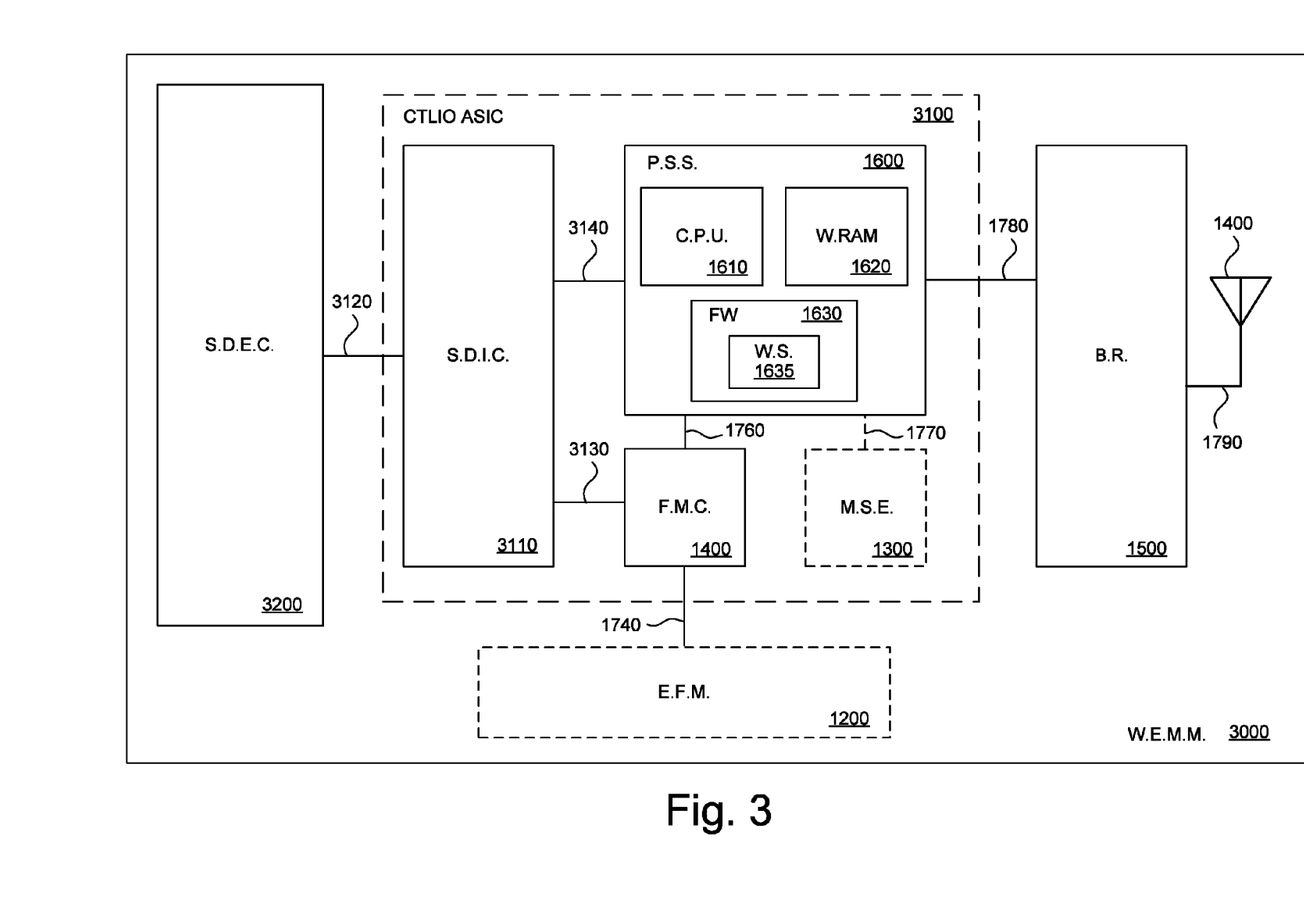
FIG. 3 is a block diagram of a WEMM 3000, physically and electrically compatible with the Secure Digital expansion module standard, and in accordance with the present invention.

Table 3 identifies and expands the abbreviations used in FIG. 3.

TABLE 3

| Associated ID No. | Abbreviation(s) | Expanded Name |
|---|---|---|
| 1200 | E.F.M. | Embedded Flash Memory |
| 1300 | M.S.E. | Media Scaling Engine |
| 1400 | F.M.C. | Flash Memory Controller |
| 1500 | B.R. | Bluetooth Radio |
| 1600 | P.S.S. | Processor Sub-System |
| 1610 | C.P.U. | Processor |
| 1620 | W.RAM | Working RAM |
| 1630 | FW | Firmware |
| 1635 | W.S. | Web Server |
| 3000 | W.E.M.M. | Wireless Enabled Memory Module |
| 3100 | CNTLIO | Control & I/O ASIC |
| 3110 | S.D.I.C. | Secure Digital Interface Controller |
| 3200 | S.D.E.C. | Secure Digital expansion connector |

An alternative embodiment is shown in FIG. 3, a block diagram of a WEMM 3000 according to the invention as implemented in an SD form factor. A custom ASIC 3100, as shown, could be optionally implemented, including e.g., the microprocessor 1600, memory interface 3110, media scaling engine 1300 and memory controller 1400 all on one chip.

In an illustrative embodiment, the WEMM 3000 processing capability includes the ability to rescale the media objects, including JPEG images and MP3 audio stored in the modules memory on the fly. This allows the WAP/Web interface to provide thumbnail images and highly compressed audio versions of the contents of the WEMM 3000 and to rescale media objects, including photos and audio recordings, to an appropriate size and quality for transmission over the wireless network.

Media objects (images and audio) are sent as an email message either via the phone's built in email capability or using an embedded SMTP/PPP stack over the phone's IP network connection (e.g. GPRS). In another embodiment, the images may be sent as an MMS message.

Those of ordinary skill in the art will recognize that additional ASIC embodiments directed toward other form factors or interfaces (such as CompactFlash, USB, other similar reduced-size physical configurations, and other similar expansion interfaces) are also possible.

Operation Separate from Host

Figures 4A, 4B, 4C:
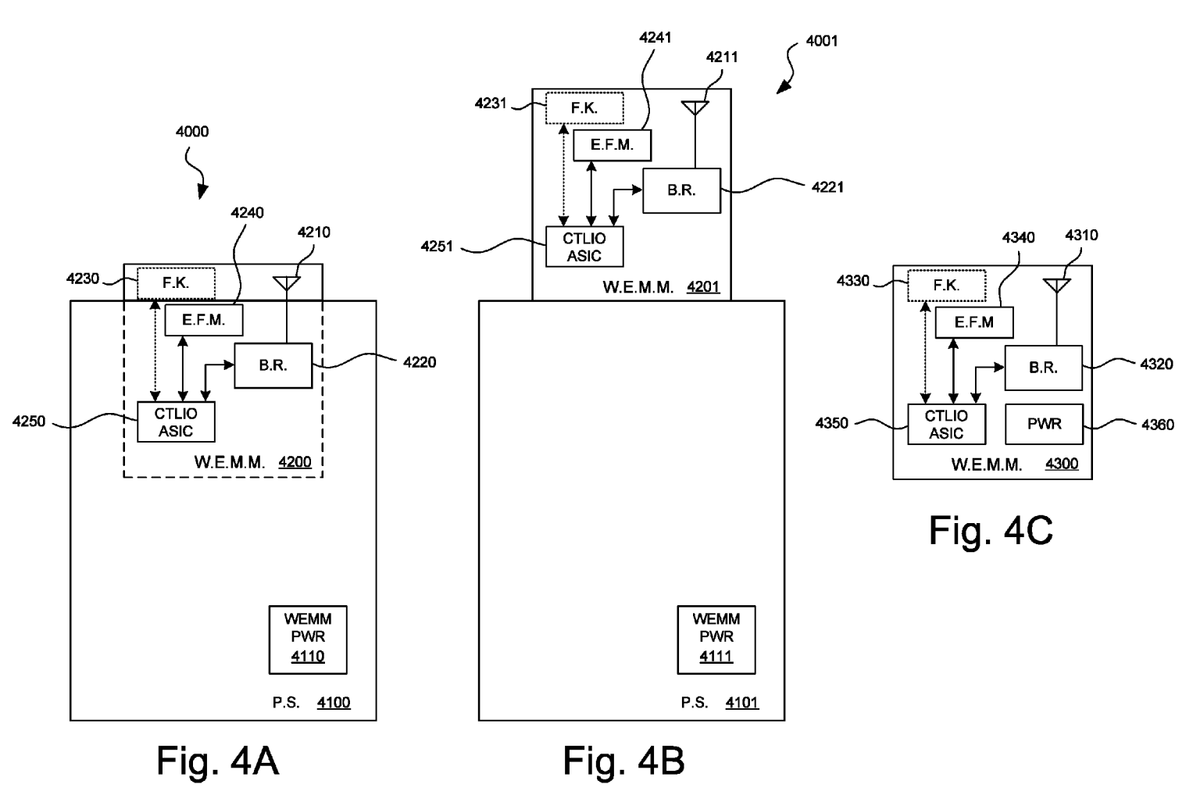
FIGS. 4A, 4B, and 4C depict further illustrative embodiments of the present invention, 4000, 4001, and 4300 respectively, in which power is supplied to the WEMM either from a customer Portable Server or from an onboard Power Source.

Alternative embodiments, illustrated in FIGS. 4A, 4B, and 4C, show how a WEMM (4200 in FIG. 4A, 4201 in FIG. 4B, and 4300 in FIG. 4C) can be used separately from the host device, when the host device does not require access to the memory. FIG. 4A shows an embodiment of a combination 4000 in which a special "holder" 4100 containing a power source 4110 is used in place of the full-function host, acting as a portable storage server and providing power to the WEMM 4200. FIG. 4B shows an embodiment of a combination 4001 in which a power-source-only portable server 4101 containing a power source 4111 is used in place of the full-function host, acting as a portable storage server and providing power to the WEMM 4201. Alternatively, FIG. 4C illustrates an embodiment in which a WEMM 4300 itself incorporates a power source 4360.

Table 4 identifies and expands the abbreviations used in FIGS. 4A and 4B.

TABLE 4

| Associated ID No. | Abbreviation(s) | Expanded Name |
| --- | --- | --- |
| 4000 | (none) | (none) |
| 4001 | (none) | (none) |
| 4100 | P.S. | Portable Server |
| 4101 | P.S. | Portable Server |
| 4110 | WEMM PWR | Wireless Enabled Memory Module Power Source |
| 4111 | WEMM PWR | Wireless Enabled Memory Module Power Source |
| 4200 | W.E.M.M. | Wireless Enabled Memory Module |
| 4201 | W.E.M.M. | Wireless Enabled Memory Module |
| 4220 | B.R. | Bluetooth Radio |
| 4221 | B.R. | Bluetooth Radio |
| 4230 | F.K. | F-key(s) |
| 4231 | F.K. | F-key(s) |
| 4240 | E.F.M. | Embedded Flash Memory |
| 4241 | E.F.M. | Embedded Flash Memory |
| 4250 | CTLIO | Control & I/O ASIC |
| 4251 | CTLIO | Control & I/O ASIC |
| 4300 | W.E.M.M. | Wireless Enabled Memory Module |
| 4320 | B.R. | Bluetooth Radio |
| 4330 | F.K. | F-key(s) |
| 4340 | E.F.M. | Embedded Flash Memory |
| 4350 | CTLIO | Control & I/O ASIC |
| 4360 | PWR | Power Source |

FIGS. 4A, 4B, and 4C also illustrate that the WEMM has at least one Function-key (F-key, i.e. a button with an associated configurable function). The F-key(s) are identified as 4230 in FIG. 4A, as 4231 in FIG. 4B, and as 4330 in FIG. 4C. Example key functions include (a) e-mailing the last-taken photo to a pre-configured address, and (b) transferring the last-taken photo to the mobile phone in preparation for manual addressing and sending.

CONCLUSION

Although the foregoing embodiments have been described in some detail for purposes of clarity of understanding, the invention is not limited to the details provided. There are many alternative ways of implementing the invention. The disclosed embodiments are illustrative and not restrictive. It will be understood that many variations in construction, arrangement and use are possible consistent with the teachings and within the scope of the claims appended to the issued patent. For example, interconnect and function-unit bit-widths, clock speeds, and the type of technology used may generally be varied in each component block. Also, unless specifically stated to the contrary, the value ranges specified, the maximum and minimum values used, or other particular specifications, are merely those of the illustrative embodiments, can be expected to track improvements and changes in implementation technology, and should not be construed as limitations.

Functionally equivalent techniques known to those of ordinary skill in the art may be employed instead of those illustrated to implement various components or sub-systems. The names given to interconnect and logic are merely illustrative, and should not be construed as limiting the concepts taught. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware). Specific variations may include, but are not limited to, variations to be expected when implementing the concepts taught herein in accordance with the unique engineering and business constraints of a particular application.

The embodiments have been illustrated with detail and environmental context well beyond that required for a minimal implementation of many of aspects of the concepts taught. Those of ordinary skill in the art will recognize that variations may omit disclosed components without altering the basic cooperation among the remaining elements. It is thus understood that much of the details disclosed are not required to implement various aspects of the concepts taught. To the extent that the remaining elements are distinguishable from the prior art, omitted components are not limiting on the concepts taught herein.

All such variations in design comprise insubstantial changes over the teachings conveyed by the illustrative embodiments. It is also understood that the concepts taught herein have broad applicability to other applications, and are not limited to the particular application or industry of the illustrated embodiments. The invention is thus to be construed as including all possible modifications and variations encompassed within the scope of the claims appended to the issued patent.

What is claimed is:

1. A removable module for coupling to a digital host and a wireless network, the coupling to the host being via an expansion port of the host, the wireless network having at least one remote wireless device, the module comprising:
   a host-to-module interconnect enabled to removably couple with the host;
   a host-to-module interface controller coupled to the host-to-module interconnect;

wireless transceiver circuitry to couple with the wireless network;

media scaling circuitry;

a memory controller;

an embedded non-volatile memory coupled to the memory controller;

a control sub-system coupled to the host-to-module interface controller, the wireless transceiver circuitry, and the memory controller, the control sub-system at least in part managing data transfers between the embedded non-volatile memory and the wireless network without requiring any action by the host;

wherein the host-to-module interface controller, the wireless transceiver circuitry, the memory controller, the embedded non-volatile memory, and the control sub-system are enabled to operate completely inside the host; and wherein the host-to-module interface controller, the memory controller, and the control sub-system are all on a single ASIC; and wherein the media scaling circuitry selectively produces a version of a requested portion of the embedded non-volatile memory content that is scaled to a selected one of a plurality of available scaling factors.

2. The removable module of claim 1, wherein the host-to-module interconnect and the host-to-module interface controller are implemented in accordance with at least one version of a CompactFlash standard.

3. The removable module of claim 1, wherein the host-to-module interconnect and the host-to-module interface controller are implemented in accordance with at least one version of a Secure Digital (SD) standard.

4. The removable module of claim 1, wherein the wireless transceiver circuitry is implemented in accordance with at least one version of a BlueTooth standard.

5. The removable module of claim 1, wherein the plurality of scaling factors includes a thumbnail scaling factor.

6. The removable module of claim 1, wherein the plurality of scaling factors includes at least a small and a large scaling factor.

7. A system comprising:
a removable module having
a host connector enabled to couple to a host in a removable manner,
an interface controller coupled to the host connector and enabled to exchange data with the host,
a wireless transceiver enabled to communicate via a wireless network,
media scaling circuitry;
a memory controller enabled to load data from and store data into a memory, and
a control sub-system coupled to the interface controller, the wireless transceiver, and the memory controller;

wherein the memory comprises a non-volatile memory embedded in the removable module;

wherein the control sub-system is enabled to manage data transfers between the memory and the wireless network without requiring any action by the host and is further enabled to operate completely inside the host;

wherein the interface controller, the memory controller, and the control sub-system are implemented on a single integrated circuit; and wherein the media scaling circuitry implements a plurality of scaling factors.

8. The system of claim 7, wherein the control sub-system is further adapted to manage data transfers between the memory and the host via the interface controller and the host connector.

9. The system of claim 7, wherein the host connector and the interface controller are compatible with at least one version of a plurality of standard expansion interfaces, the standard expansion interfaces comprising CompactFlash, SecureDigital (SD), and Universal Serial Bus compatible expansion interfaces.

10. The system of claim 7, wherein the memory further comprises a removable non-volatile memory and the memory controller and the removable non-volatile memory are compatible with at least one version of a plurality of standard removable memory interfaces, the standard removable memory interfaces comprising CompactFlash and Secure Digital (SD) standard removable memory interfaces.

11. The system of claim 7, wherein the plurality of scaling factors includes any combination of a thumbnail scaling factor, a small scaling factor, and a large scaling factor.

12. The system of claim 7, wherein the wireless transceiver is compatible with at least one version of a BlueTooth standard.

13. The system of claim 7, further comprising the host.

14. The system of claim 13, wherein the host is selected from the group consisting of a digital video system and a digital audio system.

15. The system of claim 14, wherein the digital video system comprises a digital camera.

16. The system of claim 14, wherein the digital audio system comprises an MP3 system.

17. The system of claim 7, wherein the control sub-system comprises a processor, a working RAM, and firmware.

18. The system of claim 7, wherein the control sub-system comprises a web-server.

19. The system of claim 7, further comprising a remote wireless device enabled to communicate via the wireless network.

20. The system of claim 19, wherein the remote wireless device is selected from the group consisting of a Personal Computer (PC), a Personal Digital Assistant (PDA), and a mobile phone.

* * * * *